United States Patent
Nurnberger (10) Patent No.: US 11,943,692 B2
(45) Date of Patent: Mar. 26, 2024

(54) EMERGENCY RESPONSE USING NON-CELLULAR LONG-RANGE RADIO CHANNEL AND EMERGENCY USE WI-FI HOTSPOT

(71) Applicant: Teltrust Corporation, Salt Lake City, UT (US)

(72) Inventor: Alfred R. Nurnberger, Portland, OR (US)

(73) Assignee: TELTRUST CORPORATION, Salt Lake City, UT (US)

( * ) Notice: Subject to any disclaimer, the term of this patent is extended or adjusted under 35 U.S.C. 154(b) by 0 days.

(21) Appl. No.: 17/743,172

(22) Filed: May 12, 2022

(65) Prior Publication Data

US 2023/0370828 A1 Nov. 16, 2023

(51) Int. Cl.
*H04W 4/90* (2018.01)
*H04M 1/72418* (2021.01)
*H04M 1/72436* (2021.01)
*H04M 3/51* (2006.01)

(52) U.S. Cl.
CPC ......... *H04W 4/90* (2018.02); *H04M 1/72418* (2021.01); *H04M 1/72436* (2021.01); *H04M 3/5116* (2013.01)

(58) Field of Classification Search
CPC . H04B 5/00; H04B 5/02; H04B 1/005; H04B 1/406; H04B 88/06; H04H 20/59; H04H 20/71
USPC .............................. 455/41.1, 553.1
See application file for complete search history.

(56) References Cited

U.S. PATENT DOCUMENTS

| 10,382,933 B2 | 8/2019 | Pawar et al. | |
|---|---|---|---|
| 2015/0140924 A1* | 5/2015 | Marathe | H04W 4/90 455/3.01 |
| 2018/0062873 A1* | 3/2018 | Chiang | H04W 4/18 |
| 2019/0209022 A1* | 7/2019 | Sobol | A61B 5/681 |
| 2019/0234786 A1 | 8/2019 | Klicpera | |
| 2022/0039673 A1 | 2/2022 | Sobol et al. | |

FOREIGN PATENT DOCUMENTS

| CN | 205829662 U | 12/2016 |
|---|---|---|
| CN | 108798787 A | 11/2018 |
| KR | 101518186 B1 | 5/2015 |
| KR | 20190063729 A | 6/2019 |
| KR | 102254181 B1 | 5/2021 |
| KR | 102351801 B1 | 1/2022 |
| WO | 2022045851 A1 | 3/2022 |

* cited by examiner

*Primary Examiner* — Maria El-Zoobi
(74) *Attorney, Agent, or Firm* — WORKMAN NYDEGGER (57) ABSTRACT

Emergency response by facilitating communication between an emergency communications center and user devices. Such user devices may be highly available without special training, such as cell phones. Furthermore, such communication is available even without the use of a cellular network. Thus, even in emergencies in which cellular communication is no longer possible, individuals can communicate their emergency needs and situation to an emergency communications center, allowing that center to gain a holistic, comprehensive, and fresh understanding of the needs of the community. The communication center can thereby coordinate with capable individuals and resources within the community to help address those needs.

12 Claims, 6 Drawing Sheets

EMERGENCY RESPONSE USING NON-CELLULAR LONG-RANGE RADIO CHANNEL AND EMERGENCY USE WI-FI HOTSPOT

BACKGROUND

Emergencies can come in a wide-variety of forms. There can be emergencies caused by nature, such as earthquakes, floods, tornadoes, hurricanes, cold, and the like. There can be emergencies due to the failure of needed systems, such as power, water, gas, and the like. There can also be emergencies that result from war. Essentially, an emergency is any situation that substantially changes the needs of a community, in type and/or degree. Some of the emergencies can be widespread, and result in significant community need. Accordingly, societies often organize to prepare for emergencies such that unique emergency needs can be met to the degree possible. By so doing, loss of life, injury, and suffering can be reduced.

A good emergency response is enabled by a robust and timely assessment of the needs of the community, and the timely dispatch of the resources of the community to where those resources can provide the most benefit to meet societal needs. As an example, if a child has been injured by falling debris, rescue workers may be dispatched to that location to render rescue and medical assistance. If there is a gas leak, utility workers may be dispatched to remediate the leak potential avoiding a fire or explosion. Communication is important to understand the needs and resources of the community, and to connect the proper resources to where they are needed.

However, in times of emergency, normal communications (such as cellular networks) can be disrupted. This can occur due to widespread power loss disabling or restricting normal communication, and/or perhaps due to the increased demand placed on normal communication channels that typically occurs during times of emergency.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, emergency response is enabled by facilitating communication between an emergency communications center and user devices. Such user devices may be highly available without special training, such as cell phones. Furthermore, such communication is available even without the use of a cellular network. Thus, even in emergencies in which cellular communication is no longer possible, individuals can use prevalent devices to communicate their emergency needs and situation to an emergency communications center, allowing that center to gain a holistic, comprehensive, and fresh understanding of the needs of the community. The communication center can thereby coordinate with capable individuals and resources within the community to help address those needs.

The enabled communication may be low-bandwidth since the amount of information needed for communication during emergencies is small, and include perhaps just simple messages that focus on the essentials. Furthermore, the communication protocol may require little power, thereby allowing the communication to continue for extended periods on battery power, which is particularly useful when the emergency has disrupted the power grid and that disruption is long-lasting.

In accordance with the principles described herein, emergency communication hardware nodes intermediate communication between an emergency communications center and user devices. The emergency communication hardware node includes a long-range radio receiver configured to receive messages over a non-cellular long-range low-bandwidth radio channel (such as a LoRa channel). In addition, the hardware node also includes a long-range radio transmitter configured to transmit messages over the non-cellular long-range low-bandwidth radio channel, which may be a separate component or integrated with the receiver to form a transceiver.

The channel may use an adaptive bitrate radio protocol that is low-bandwidth, such as LoRa. As an example, the channel may have a maximum bitrate of less than one megabit per second, and a minimum bitrate of less than a kilobit per second. In addition, the channel may be long distance, thereby enabling communication using a network of perhaps (but not necessarily) sparsely distributed nodes throughout the community. As an example, the channel may have a line-of-sight range of over a mile, as LoRa easily does.

In addition to the capability to communicate with the emergency communications center over the long-range channel, the hardware node also has a wi-fi access point component configured to, when activated, enable a local wi-fi hotspot, which can be considered an emergency use wi-fi hotspot. The hardware node also includes an emergency response component configured to respond to an emergency message received over the long-range channel from an emergency communications center by activating the wi-fi access point component. The hardware node also responds to the emergency message by facilitating one or two-directional communication between the user device and the emergency communications center using the wi-fi hotspot and the long-range channel.

In some embodiments, when the wi-fi access point component enables the local wi-fi hotspot, the wi-fi access point component may also provide a captive portal that is displayed at user devices within the local wi-fi hotspot once the user device connects to that hotspot. The captive portal provides an interface that permits low bandwidth communication (such as text and binary messages). As an example, the captive portal might provide a chat window, and/or buttons to report different types and levels of need during the emergency. Thus, the captive portal may be considered an emergency use captive portal.

Thus, the principles described herein provide a robust emergency response mechanism that has the potential to save human life, reduce human injury, and alleviate human suffering in the event of an emergency. Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In accordance with the principles described herein, emergency response is enabled by facilitating communication between an emergency communications center and user devices. Such user devices may be highly available without special training, such as cell phones. Furthermore, such communication is available even without the use of a cellular network. Thus, even in emergencies in which cellular communication is no longer possible, individuals can use prevalent devices to communicate their emergency needs and situation to an emergency communications center, allowing that center to gain a holistic, comprehensive, and fresh understanding of the needs of the community. The communication center can thereby coordinate with capable individuals and resources within the community to help address those needs.

The enabled communication may be low-bandwidth since the amount of information needed for communication during emergencies is small, and include perhaps just simple messages that focus on the essentials. Furthermore, the communication protocol may require little power, thereby allowing the communication to continue for extended periods on battery power, which is particularly useful when the emergency has disrupted the power grid and that disruption is long-lasting.

In accordance with the principles described herein, emergency communication hardware nodes intermediate communication between an emergency communications center and user devices. The emergency communication hardware node includes a long-range radio receiver configured to receive messages over a non-cellular long-range low-bandwidth radio channel (such as a LoRa channel). In addition, the hardware node also includes a long-range radio transmitter configured to transmit messages over the non-cellular long-range low-bandwidth radio channel, which may be a separate component or integrated with the receiver to form a transceiver.

The channel may use an adaptive bitrate radio protocol that is low-bandwidth, such as LoRa. As an example, the channel may have a maximum bitrate of less than one megabit per second, and a minimum bitrate of less than a kilobit per second. In addition, the channel may be long distance, thereby enabling communication using a network of perhaps (but not necessarily) sparsely distributed nodes throughout the community. As an example, the channel may have a line-of-sight range of over a mile, as LoRa easily does.

In addition to the capability to communicate with the emergency communications center over the long-range channel, the hardware node also has a wi-fi access point component configured to, when activated, enable a local wi-fi hotspot, which can be considered an emergency use wi-fi hotspot. The hardware node also includes an emergency response component configured to respond to an emergency message received over the long-range channel from an emergency communications center by activating the wi-fi access point component. The hardware node also responds to the emergency message by facilitating one or two-directional communication between the user device and the emergency communications center using the wi-fi hotspot and the long-range channel.

In some embodiments, when the wi-fi access point component enables the local wi-fi hotspot, the wi-fi access point component may also provide a captive portal that is displayed at user devices within the local wi-fi hotspot once the user device connects to that hotspot. The captive portal provides an interface that permits low bandwidth communication (such as text and binary messages). As an example, the captive portal might provide a chat window, and/or buttons to report different types and levels of need during the emergency. Thus, the captive portal may be considered an emergency use captive portal. Thus, the principles described herein provide a robust emergency response mechanism that has the potential to save human life, reduce human injury, and alleviate human suffering in the event of an emergency.

Figure 1:
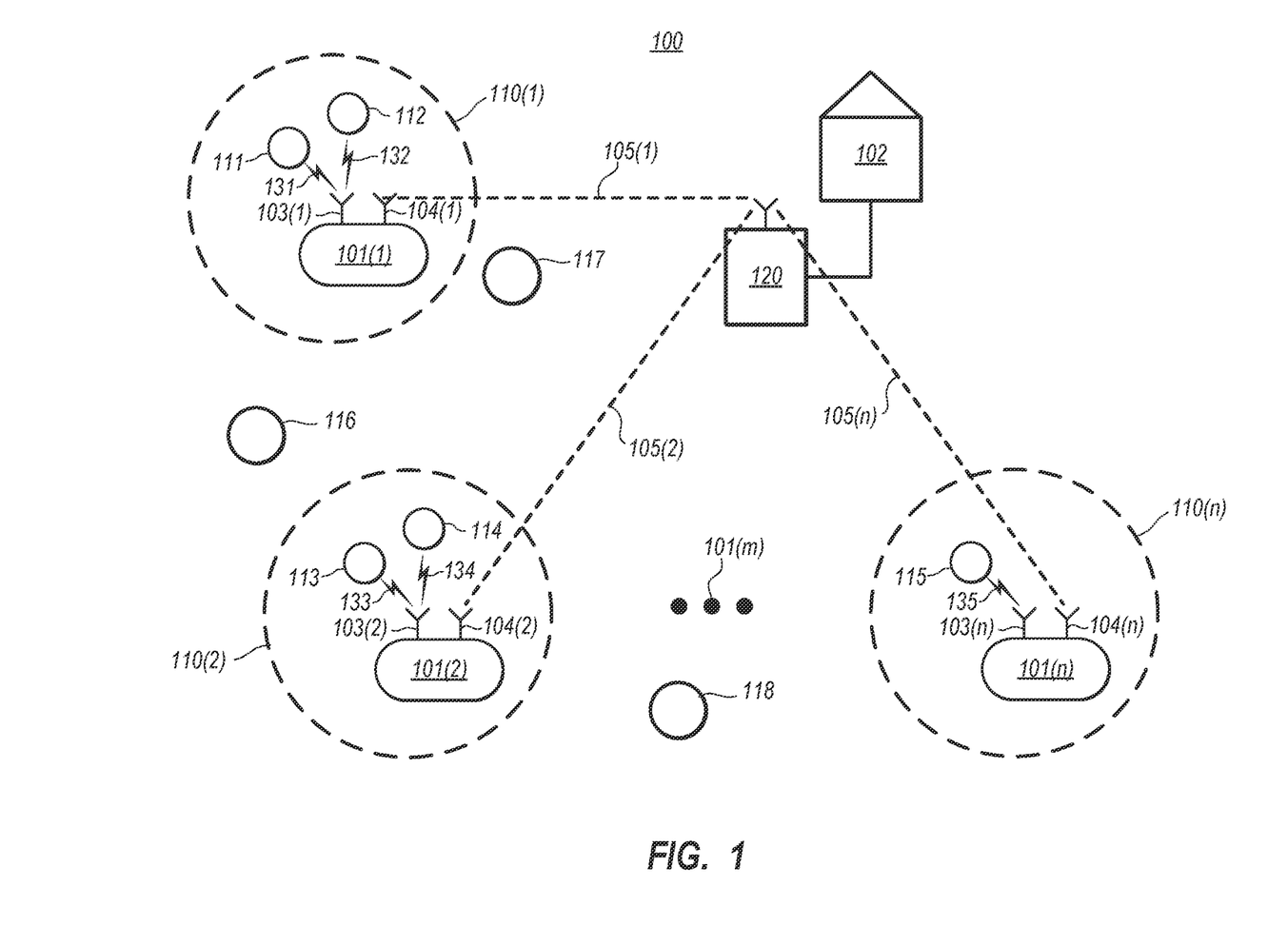
FIG. 1 illustrates a system in accordance with the principles described herein, in which there are hardware nodes that intermediate communication between user devices and an emergency communications center in the event of an emergency.

FIG. 1 illustrates a system 100 in accordance with the principles described herein. The system 100 includes hardware nodes 101(1) through 101(n) that are within long-range radio range of a base station 120 of an emergency communications center 102. Each hardware node 101 has a capability to communicate over long range radio to the base station 120 as well as at least is selectively capable of communicating over wi-fi with respective user devices within a local wi-fi hotspot created by the hardware node 101. Leveraging these two capabilities, the hardware nodes 101 each intermediates communications between the emergency communications center 102 and respective user devices that are within wi-fi range of the hardware node. In FIG. 1, the user devices are represented with small circles, and the hardware nodes are represented as ovals.

For example, in FIG. 1, each hardware node 101(1) through 101(n) is illustrated as having an associated local wi-fi hotspot 110(1) through 110(n), respectively. The local wi-fi hotspots represent areas that are within wi-fi range of the corresponding hardware node when the wi-fi hotspot is enabled. When a user device is wi-fi enabled and within a wi-fi hotspot, the user device can discover and connect to a wi-fi network associated with the wi-fi hotspot, and thereafter communicate over the wi-fi network.

Because the wi-fi hotspots can be turned on and off, the wi-fi hotspots 110 are each represented with dashed-lined borders. Although the wi-fi hotspots 110 are represented as circles, it will be appreciated that the actual wi-fi range of a wi-fi network may have a more complex and dynamic shape that depends on numerous factors such as obstacles, walls, interference, signal strength, and the like. However, a circle is used merely to represent the principle that each wi-fi network will have a particular range.

The hardware nodes 101 each use one antenna (called herein a "wi-fi antenna") for communicating over wi-fi with user devices within wi-fi range of the hardware node, and another antenna (called herein a "long-range radio antenna") for communicating over longer ranges with the base station 120 of the emergency communications center 102. For example, in FIG. 1, each hardware node 101(1) through 101(n) has respective wi-fi antennas 103(1) through 103(n) for communicating with user devices within the corresponding wi-fi hotspot 110(1) through 110(n). Furthermore, each hardware node 101(1) through 101(n) has respective long-range radio antennas 104(1) through 104(n).

As an example, the hardware node 101(1) has associated wi-fi hotspot 110(1), which encompasses two user devices 111 and 112. Accordingly, the hardware node 101(1) can selectively communicate with the user devices 111 and 112 using the wi-fi antenna 103(1) as represented by respective connections 131 and 132. In FIG. 1, wi-fi connections are each represented as a jagged line. The hardware node 101(1) also can communicate with the emergency communications center 102 as represented by the long-range radio connection 105(1). Thus, when the wi-fi hotspot 110(1) is enabled, the hardware node 101(1) is capable of intermediating communication between the user device 111 and the emergency communications center 102 using wi-fi connection 131 and long-range radio connection 105(1), and between the user device 112 and the emergency communications center 102 using wi-fi connection 132 and long-range radio connection 105(1).

Also, the hardware node 101(2) can selectively communicate with the user devices 113 and 114 using the wi-fi antenna 103(2) as represented by respective wi-fi connections 133 and 134. The hardware node 101(2) also can communicate with the emergency communications center 102 as represented by the long-range radio connection 105(2). Thus, when the wi-fi hotspot 110(2) is enabled, the hardware node 101(2) is capable of intermediating communication between the user device 113 and the emergency communications center 102 using wi-fi connection 133 and long-range radio connection 105(2), and between the user device 114 and the emergency communications center using wi-fi connection 134 and long-range radio connection 105(2).

Finally, the hardware node 101(3) can selectively communicate with the user device 115 using the wi-fi antenna 103(n) as represented by wi-fi connection 135. The hardware node 101(n) also can communicate with the emergency communications center 102 as represented by the long-range radio connection 105(n). Thus, when the wi-fi hotspot 110(n) is enabled, the hardware node 101(2) is capable of intermediating communication between the user device 115 and the emergency communications center 102 using wi-fi connection 135 and long-range radio connection 105(n).

In FIG. 1, there are some illustrated user devices 116, 117 and 118 that are not within the local wi-fi hotspot of any of the hardware nodes. This is merely to demonstrate that the system 100 may not encompass every corner of a community. However, in order to facilitate as comprehensive of an emergency response as possible, the coverage of the system 100 is preferably as complete as feasible and viable. Nevertheless, even with less than complete coverage, the principles described herein provide the emergency communications center with a comprehensive view of the needs of the community.

While each wi-fi hotspot 110 may always be active, even if not in case of emergency, in some embodiments described herein, the wi-fi hotspot is enabled by the respective hardware node in response to an emergency signal received by the hardware node from the emergency communications center. Thus, the emergency communications center 102 can cause all of the wi-fi hotspots to be enabled by broadcasting an emergency message.

Once a local wi-fi hotspot is enabled, user devices within that hotspot can communicate with the hardware node providing that wi-fi hotspot. Thereafter, a given hardware node can intermediate communications between respective user devices with the corresponding local hotspot and the emergency communications center. That is, the hardware node can facilitate inbound communication from the user device to the emergency communications center by receiving a wi-fi communication from the user device over the corresponding wi-fi network, and transmitting the communication (or essential content of the communication) to the emergency communications center. Alternatively, or in addition, the hardware node can facilitate outbound communication from the emergency communications center to the user device by receiving a communication transmitted by a long-range radio base station 120 of the emergency communications center 102, and then transmitting the communication (or essential content of the communication) to the user device over the wi-fi network.

The system 100 of FIG. 1 is a very simple example in order to explain the concepts herein without an unduly complex and more realistic example. For instance, the principles described herein do not restrict the number "n" of hardware nodes that can be within the system 100. "n" can be any whole number, including one. If "n" is one, there would be but a single hardware node 101(1) within the system 100. On the other hand, "n" could be a very large number, which would be more suitable if the system spanned a larger and/or populous territory (such as a town or city). Accordingly, there may be a large number of hardware nodes within the system 100. There may in fact be a variable number of hardware nodes within the system 100, as hardware nodes are brought online or become in range of the emergency communications center 102, or as hardware nodes are broad offline or fall out of range of the emergency communications center 102. The ellipsis 101(m) represents that the principles described herein are not limited to the number of hardware nodes within the system 100, or the particular placement position of hardware nodes within the system 100.

Also, the example of FIG. 1 is kept simple as there are only illustrated a small and static number of user devices shown within a given wi-fi hotspot. However, in reality, there may be more or less user devices (perhaps zero, perhaps many) within a given wi-fi hotspot. Furthermore, user devices tend to move around as their users wander.

Thus, the number and position of user devices within a given wi-fi hotspot may dynamically change, without impacting the broader principles described herein.

Figure 2:
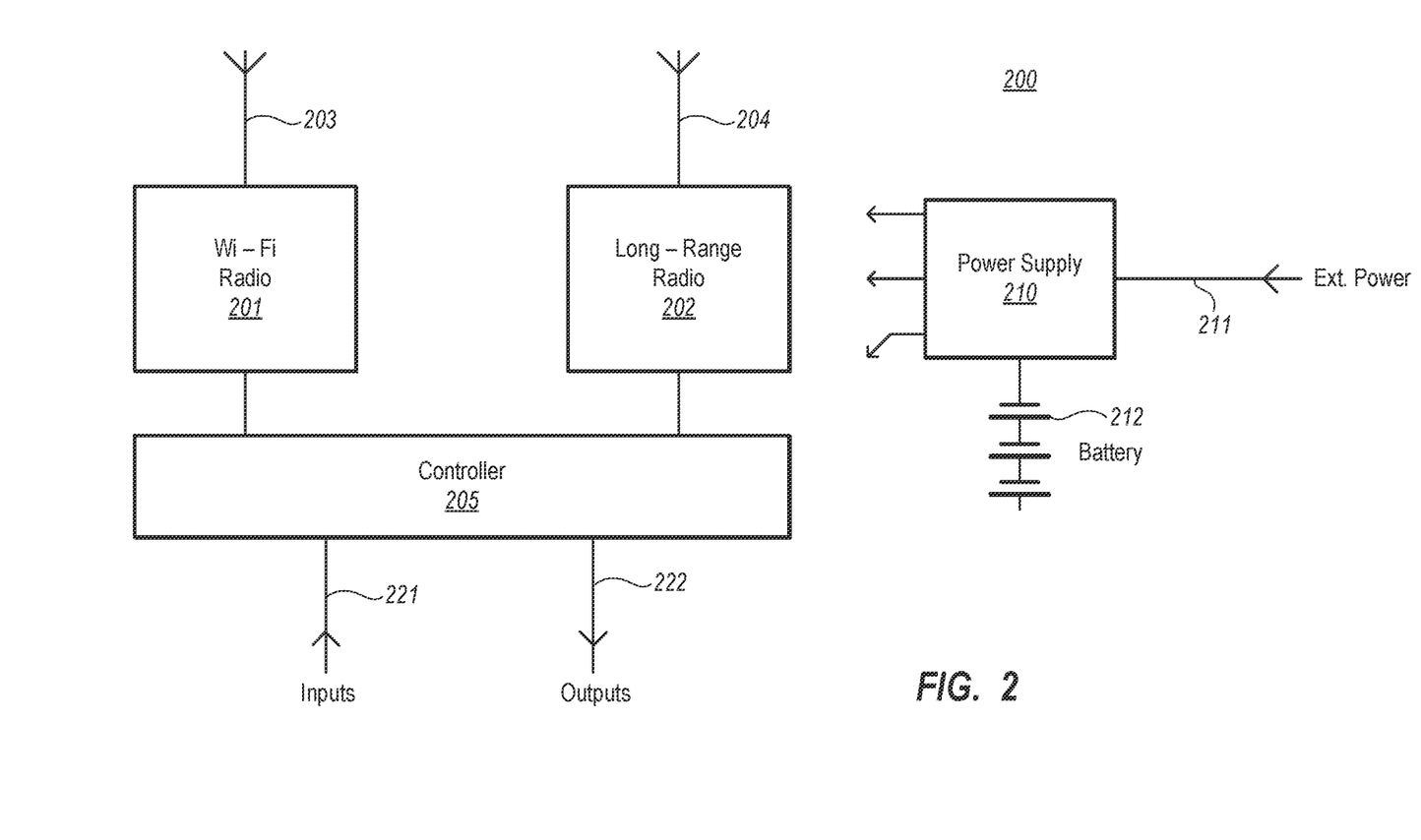
FIG. 2 illustrates an emergency communication hardware node that represents an example of how each of the hardware nodes of FIG. 1 may be structured.

Prior to proceeding to FIG. 2, this description mentions a brief note about nomenclature. In FIG. 1, there are a number of elements that are referenced by numbers that use a suffix in parentheses. For instance, there are hardware nodes 101(1) through 101(n), wi-fi antennas 103(1) through 103(n), long-range radio antennas 104(1) through 104(n), long-range radio connections 105(1) through 105(n), and wi-fi hotspots 110(1) through 110(n). When such elements are referred to in their entirety, they may be referred to within the suffix. For example, the terms "hardware nodes 101", "each hardware node 101", or "any hardware node 101", may be used. The same may be said of the wi-fi antennas 103, the long-range radio antennas 104, the long-range radio connections 105, and the wi-fi hotspots 110.

FIG. 2 illustrates an emergency communication hardware node 200 that represents an example of how each of the hardware nodes 101 of FIG. 1 may be structured. The hardware node 200 includes a wi-fi radio 201 for communicating with user devices using the wi-fi antenna 203. The wi-fi radio antenna 203 is an example of each of the wi-fi radio antennas 103 of FIG. 1. The hardware node 200 also includes a long-range radio 202 for communicating with the emergency communications center using the long-range radio antenna 204. The long-range radio antenna 204 is an example of each of the long-range radio antennas 104 of FIG. 1.

The wi-fi radio 201 handles communication at the wi-fi physical layer in that the wi-fi radio 201 generates the physical signals that are transmitted via the wi-fi antenna 203 to the user device, and receives physical signals that are received via the wi-fi antenna 203 from the user device. The long-range radio 202 also handles communication at the physical layer, but using a long-range radio channel, in that the long-range radio 202 generates the physical signals that are transmitted via the long-range radio antenna 204 to the base station of the emergency communications center, and receives the physical signals that are received via the long-range radio antenna 204 from the base station of the emergency communications center.

The controller 205 handles logic performed above the physical layer for both the long-range radio channel and the wi-fi hotspot. As an example, the controller 230 activates and de-activates the respective wi-fi hotspot, and potentially also provides a captive portal for any user device that connects to the wi-fi hotspot. That captive portal may be a suitable portal that allows the user to enter simple messages to be sent inbound to the emergency communications center, and presents simple messages that were sent outbound from the emergency communications center to the user device. An input port 221 is provided for purposes of programming the controller 205. The output port 222 is provided for purposes of performing diagnostics on the controller 205. The input port 221 may also be a manual control that causes the hardware node to automatically send a message to the emergency communications center over the long-range radio channel.

The hardware node 200 also has a power supply 210 that is configured to operate on external power 211 from the power grid when the power grid is available, and operate on battery power 212 when the power grid is not available. The long-range radio is not a cellular radio. In one embodiment, the long-range radio consumes low power, and thus when grid power is disrupted, the hardware node continues to operate long term (for weeks or months). This may be accomplished by using a non-cellular low bandwidth protocol, such as LoRa. However, any long-range low-power radio protocol will suffice. Example characteristics of a radio protocol that consumes low power is an adaptive bitrate radio protocol that has a low maximum bitrate (e.g., of less than one megabit per second), and a low minimum bitrate (e.g., of less than one kilobit per second). Another preferred characteristic is that the radio protocol is long-range (e.g., has a maximum line-of-sight range of over one mile).

Figure 3:
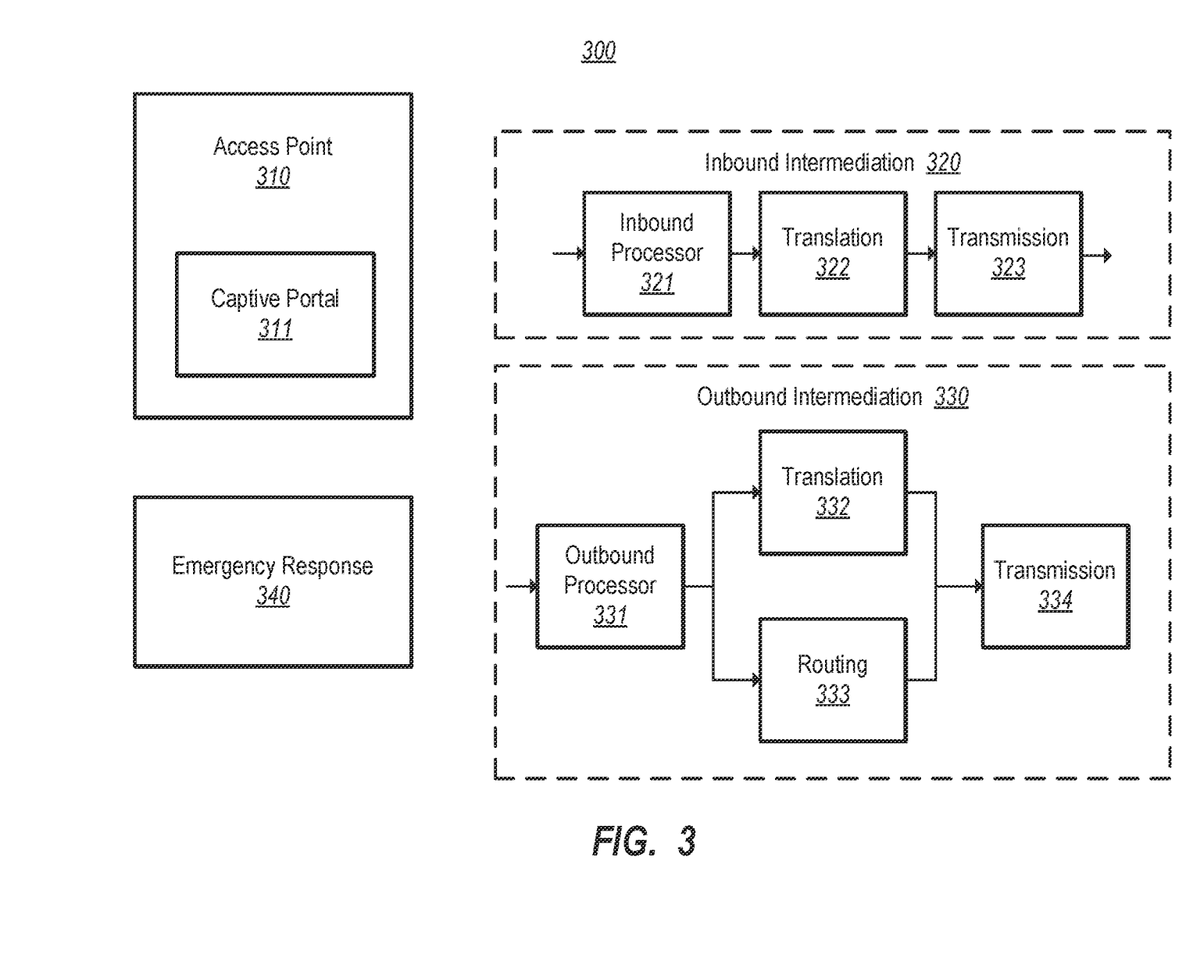
FIG. 3 illustrates a software architecture that may be operated by the controller of the hardware node in order to perform the various functions described herein for the controller.

FIG. 3 illustrates a software architecture 300 that may be operated by the controller 205 in order to perform the various functions described herein for the controller. The software architecture comprises various components. Each of those components may be structured as described below for the executable component 606 of FIG. 6. As an example, the software architecture 300 includes an access point component 310 that is capable of activating and deactivating a corresponding local wi-fi hotspot, broadcast the associated wi-fi network identifier, and connect to user devices that request to connect to the wi-fi network. In addition, the access point component 310 is configured to present the captive portal 311 to those user devices that connect to the associated wi-fi network.

The controller intermediates inbound messages by processing inbound messages received from user device over the wi-fi network, translates those inbound messages if appropriate, and initiates transmission of the respective inbound message to the emergency communications center using the long-range radio channel. Referring to FIG. 3, the software architecture 300 includes inbound intermediation components 320 including an inbound message processor 321 that processes inbound messages received from a user device over the wi-fi hotspot, translates the inbound message if appropriate using the inbound translation component 322, and initiates transmission of the inbound message to the emergency communications center using the inbound transmission component 323.

Alternatively, or in addition, the controller intermediates outbound messages by processing outbound messages received from emergency communications center over long-range radio, translates those outbound messages if appropriate, determines which user device (if not all) to send the outbound message to, and initiates transmission of the respective outbound message to the user device over the wi-fi network. Referring to FIG. 3, the software architecture 300 includes outbound intermediation components 330 including an outbound message processor 331 that processes outbound messages received from the emergency communications center over the long-range radio channel, translates the outbound message if appropriate using the outbound translation component 332, determines which user device (if not all) to send the outbound communication to using the router component 333, and initiates transmission of the outbound message to the user device using the outbound transmission component 334.

Figure 4:
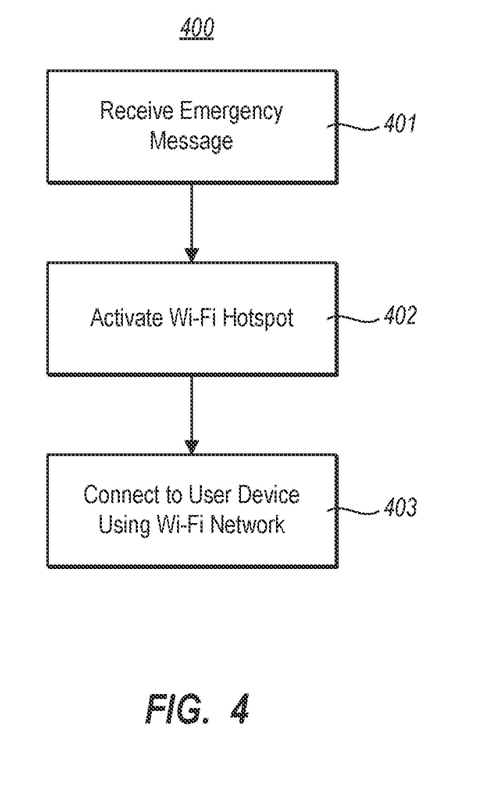
FIG. 4 illustrates a flowchart of a method for the emergency response component to respond to the emergency message from the emergency communications center, in accordance with the principles described herein.

The controller also includes an emergency response component 340. The emergency response component 340 is configured to respond to an emergency message from the emergency communications center. FIG. 4 illustrates a flowchart of a method 400 for the emergency response component to respond to the emergency message from the emergency communications center, in accordance with the principles described herein. In an example referred to herein as the "subject example", the method 400 is performed by an emergency response component within the hardware node 101(1) of FIG. 1 in order to facilitate communication between the user device 111 and the emergency communications center 102. However, the method 400 may also be performed by any of the hardware nodes in order to facilitate communication between any of their respective user devices and the emergency communications center 102.

The method 400 includes receiving an emergency message from the emergency communications center (act 401). This is what triggers the emergency response component 340 into emergency response mode. In response, the emergency response component 340 causes the wi-fi access point component 310 to activate the local wi-fi hotspot (act 402) and connects to a user device within the hotspot (act 403). In the subject example, the hardware node 101(1) activates the wi-fi hotspot 110(1) and forms the wi-fi connection 131 with the user device 111. At this point, if the hardware node supports inbound messaging from the user device to the emergency communications center, the inbound intermediation components 320 operate as previously described to facilitate the inbound messages. If the hardware node supports outbound messaging from the emergency communications center to the user device, the outbound intermediation components 330 operate as previously described to facilitate outbound messages. Preferably, the hardware node supports both inbound messages and outbound messages.

As previously mentioned, when the wi-fi network is enabled, those user devices within the wi-fi hotspot will see that emergency wi-fi network, and may choose to connect to that wi-fi network. The emergency wi-fi network may be named so as to make very clear that the wireless network is for facilitating emergency messages during times of emergency. In addition, as previously mentioned, when the user device connects to the emergency wi-fi network, a captive portal may be presented to allow the user to receive basic low-bandwidth data (e.g., text) about the nature of the emergency, and provide controls that may be used to report low-bandwidth information back to the emergency communications center.

Figure 5:
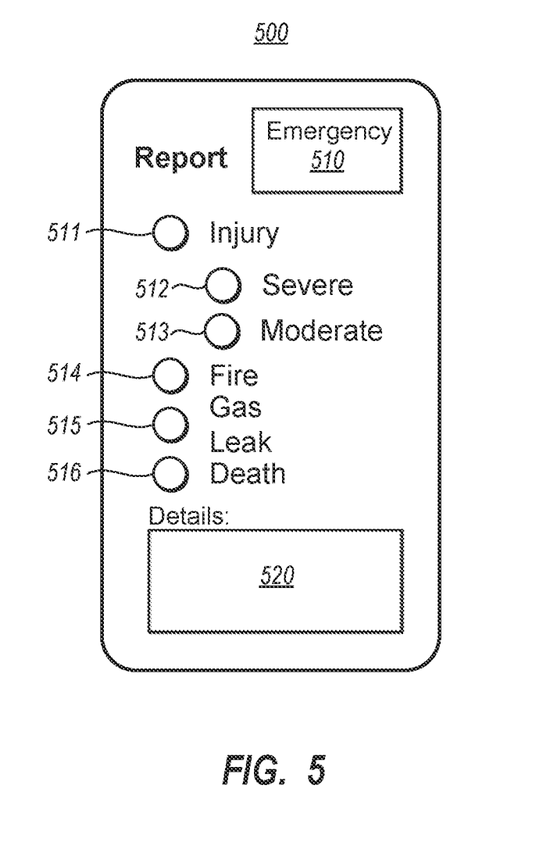
FIG. 5 illustrates an example of a captive portal user interface that may be displayed on the user device once the user connects to the emergency wi-fi network.

FIG. 5 illustrates a mere example of a captive portal user interface 500 that may be displayed on the user device once the user connects to the emergency wi-fi network. The user interface includes a portion 510 that includes text regarding the nature of the emergency. In addition, the user might use interface elements 511 through 516 to give the emergency communications center immediate information regarding what the user is reporting, whether it be an injury, fire, leak, death, and so forth. A chat window 520 may also be provided to allow the user to provide some text about further details. Thus, the captive portal encourages only small amounts of data to be communicated, which is appropriate since the long-range radio protocol is low bandwidth. Thus, the captive portal user interface can be used to render messages that are communicated as an outbound communication from the emergency communications center, and can be used to create inbound communication from the user device through the emergency communication hardware node to the emergency communications center.

Accordingly, the principles described herein provide a robust emergency response system which allows for the efficient gathering of emergency information from throughout the community using prolific user devices, to allow the emergency communications center to quickly assess the needs of the community. The principles described herein also allow the emergency communications center to communicate basic information to those individuals that have needs, and to coordinate with resources within the community to meet those needs. Thus, the principles described herein have great potential to preserve life, health, and meet basic needs of the community in cases of emergency.

Because the principles described herein may be performed in the context of a computing system (e.g., the controller 205 may, but need not, be implemented by a computing system), some introductory discussion of a computing system will be described with respect to FIG. 6. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
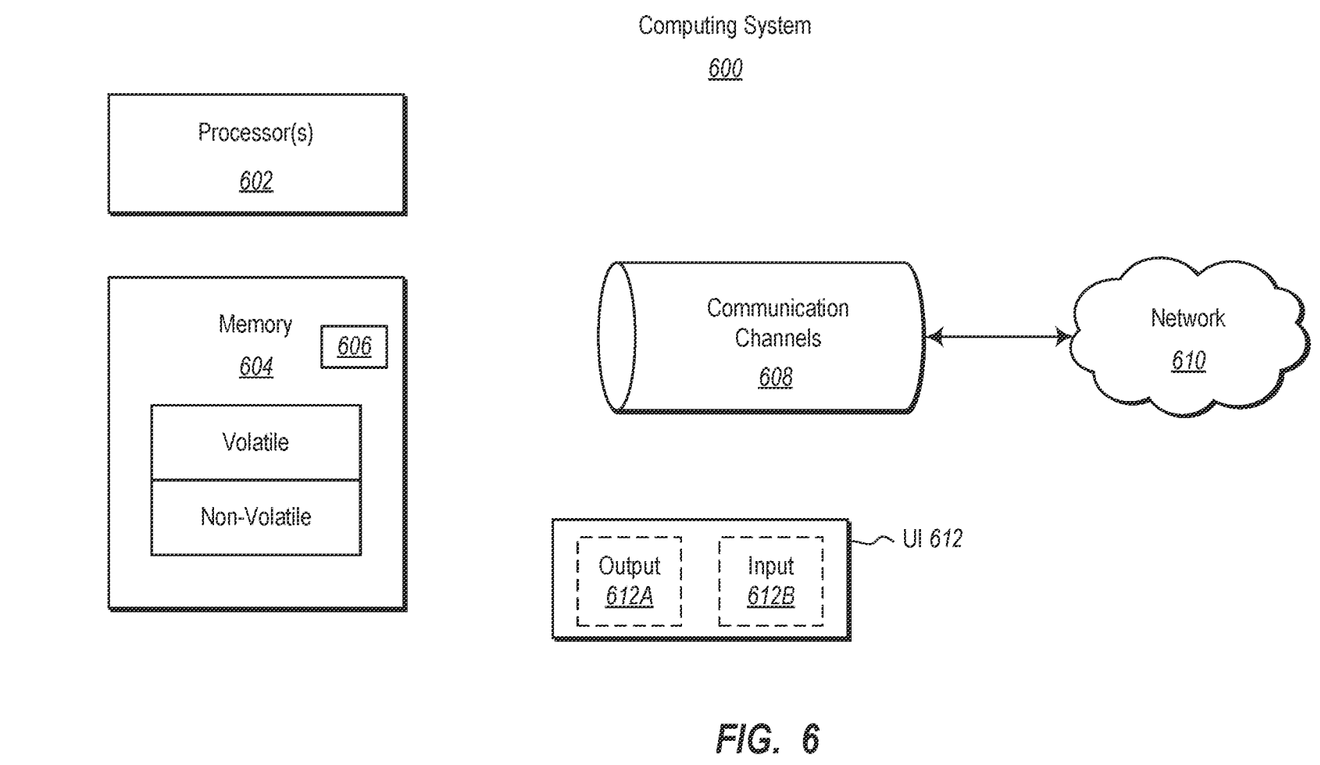
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. An emergency communication hardware node comprising:
    a long-range radio receiver configured to receive messages over a non-cellular long-range low-bandwidth radio channel that uses radio protocol that 1) has a maximum bitrate of less than one megabit per second, and a minimum bitrate of less than one kilobit per second, and 2) has a maximum line-of-sight range of over one mile;
    a long-range radio transmitter configured to transmit messages over the non-cellular long-range low-bandwidth radio channel;
    a wi-fi access point component configured to, when activated, enable a local wi-fi hotspot; and
    an emergency response component configured to respond to an emergency message from an emergency communications center by 1) activating the wi-fi access point component, and 2) facilitating communication between a user device and the emergency communications center by facilitating at least one of outbound communication from the communication center to the user device and inbound communication from the user device to the communication center,
    the emergency response component further configured to respond to the emergency message by facilitating both outbound communication from the emergency communications center to the user device and inbound communication from the user device to the communication center,
    the emergency response component further configured to cause a captive portal to be rendered on the user device through which a user of the user device can receive rendering of messages that are communicated as an outbound communication from the emergency communication through the emergency communication hardware node to the user device, and configured such that the user of the user device can cause creation of messages that are communicated as an inbound communication from the user device through the emergency communication hardware node to the emergency communications center.

2. An emergency communication hardware node comprising:
    a long-range radio receiver configured to receive messages over a non-cellular long-range low-bandwidth radio channel that uses radio protocol that 1) has a maximum bitrate of less than one megabit per second, and a minimum bitrate of less than one kilobit per second, and 2) has a maximum line-of-sight range of over one mile;
    a long-range radio transmitter configured to transmit messages over the non-cellular long-range low-bandwidth radio channel;
    a wi-fi access point component configured to, when activated, enable a local wi-fi hotspot; and
    an emergency response component configured to respond to an emergency message from an emergency communications center by 1) activating the wi-fi access point component, and 2) facilitating communication between a user device and the emergency communications center by facilitating at least one of outbound communication from the communication center to the user device and inbound communication from the user device to the communication center,
    the emergency response component configured to respond to the emergency message by facilitating output communication from the emergency communications center to the user device via the long-range radio low bandwidth radio channel and a wi-fi channel enabled by the wi-fi access point component,
    the emergency response component further configured to cause a captive portal to be rendered on the user device through which a user of the user device can receiving rendering of messages that are communicated as an outbound communication from the emergency communication through the emergency communication hardware node to the user device.

3. An emergency communication hardware node comprising:
    a long-range receiver configured to receive messages over a non-cellular long-range low-bandwidth radio channel that uses radio protocol that 1) has a maximum bitrate of less than one megabit per second, and a minimum bitrate of less than one kilobit per second, and 2) has a maximum line-of-sight range of over one mile;
    a long-range radio transmitter configured to transmit messages over the non-cellular long-range low-bandwidth radio channel;
    a wi-fi access point component configured to, when activated, enable a local wi-fi hotspot; and
    an emergency response component configured to respond to an emergency message from an emergency communications center by 1) activating the wi-fi access point component, and 2) facilitating communication between a user device and the emergency communications center by facilitating at least one of outbound communication from the communication center to the user device and inbound communication from the user device to the communication center, the emergency response component configured to respond to the emergency message by facilitating inbound communication from the user device to the emergency communications center via a wi-fi channel enabled by the wi-fi access point component and the long-range radio low-bandwidth radio channel, the emergency response component being configured to cause a captive portal to be rendered on the user device such that the user of the user device can cause creation of messages that are communicated as an inbound communication from the user device through the emergency communication hardware node to the emergency communications center.

4. The emergency communication hardware node in accordance with claim 1, the non-cellular long-range low-bandwidth radio channel being a LoRa channel.

5. The emergency communication hardware device in accordance with claim 1, further comprising a manual control, the emergency response component further configured to cause a message to be sent to the emergency communications center over the non-cellular long-range low-bandwidth radio channel in response to activation of the manual control.

6. An emergency response system configured to facilitate emergency response in response to a broadcast emergency message from an emergency communications center, the emergency response system comprising:
- a plurality of distributed hardware nodes, each having a long-range radio receiver configured to receive messages broadcast by the emergency communications center over a non-cellular long-range low-bandwidth radio channel that uses a radio protocol that 1) has a maximum bitrate of less than one megabit per second, and a minimum bitrate of less than one kilobit per second, and 2) has a maximum line-of-sight range of over one mile, each of at least some of the distributed hardware nodes also having the following:
- a wi-fi access point component configured to, when activated, enable a corresponding local wi-fi hotspot; and
- an emergency response component configured to respond to an emergency message from an emergency communications center by 1) activating the wi-fi access point component, and 2) facilitating communication between a user device and the emergency communications center by facilitating at least one of outbound communication from the communication center to a respective user device and inbound communication from the respective user device to the communication center, such that for at least some of the distributed hardware nodes that have an emergency response component, the emergency response component is configured to respond to the emergency message by facilitating inbound communication from the user device to the emergency communications center via a wi-fi channel enabled by the wi-fi access point component and the long-range radio low-bandwidth radio channel, the emergency response component for each of one or more of the at least some of the distributed hardware nodes that have an emergency response component further configured to cause a captive portal to be rendered on the respective user device, the captive portal being configured such that the user of the user device can cause creation of messages that are communicated as an inbound communication from the user device through the emergency communication hardware node to the emergency communications center.

7. The emergency response system in accordance with claim 6, such that for at least some of the distributed hardware nodes that have an emergency response component, the emergency response component is configured to respond to the emergency message by facilitating both outbound communication from the emergency communications center to the respective user device and inbound communication from the respective user device to the communication center.

8. The emergency response system in accordance with claim 7, the emergency response component for each of one or more of the at least some of the distributed hardware nodes that have an emergency response component further configured to cause a captive portal to be rendered on the respective user device through which a user of the user device can receiving rendering of messages that are communicated as an outbound communication from the emergency communication through the emergency communication hardware node to the respective user device, and configured such that the user of the respective user device can cause creation of messages that are communicated as an inbound communication from the respective user device through the emergency communication hardware node to the emergency communications center.

9. The emergency response system in accordance with claim 6, such that for at least some of the distributed hardware nodes that have an emergency response component, the emergency response component is configured respond to the emergency message by facilitating output communication from the emergency communications center to the respective user device via the long-range radio low-bandwidth radio channel and a wi-fi channel enabled by the wi-fi access point component.

10. The emergency response system in accordance with claim 9, the emergency response component for each of one or more of the at least some of the distributed hardware nodes that have an emergency response component further configured to cause a captive portal to be rendered on the respective user device through which a user of the respective user device can receiving rendering of messages that are communicated as an outbound communication from the emergency communication through the emergency communication hardware node to the respective user device.

11. The emergency response system in accordance with claim 6, the non-cellular long-range low-bandwidth radio channel being a LoRa channel.

12. The emergency response system in accordance with claim 6, at least some of the distributed hardware nodes comprising a manual control that is configured to cause a message to be sent to the emergency communications center over the non-cellular long-range low-bandwidth radio channel in response to activation of the manual control.

* * * * *